United States Patent
Sivaramakrishnan et al.

(10) Patent No.: US 10,221,703 B2
(45) Date of Patent: Mar. 5, 2019

(54) ARTICLES HAVING DAMAGE-TOLERANT THERMAL BARRIER COATING

(71) Applicant: GENERAL ELECTRIC COMPANY, Schenectady, NY (US)

(72) Inventors: Shankar Sivaramakrishnan, Schenectady, NY (US); Larry Steven Rosenzweig, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 398 days.

(21) Appl. No.: 14/950,718

(22) Filed: Nov. 24, 2015

(65) Prior Publication Data
US 2017/0145836 A1    May 25, 2017

(51) Int. Cl.
| | |
|---|---|
| *F01D 5/28* | (2006.01) |
| *C23C 4/134* | (2016.01) |
| *C23C 28/00* | (2006.01) |
| *C23C 4/11* | (2016.01) |
| *C23C 4/073* | (2016.01) |

(52) U.S. Cl.
CPC .............. *F01D 5/288* (2013.01); *C23C 4/073* (2016.01); *C23C 4/11* (2016.01); *C23C 4/134* (2016.01); *C23C 28/3215* (2013.01); *C23C 28/3455* (2013.01); *F05D 2300/2118* (2013.01); *Y02T 50/671* (2013.01)

(58) Field of Classification Search
CPC ....................................................... C23C 4/11
See application file for complete search history.

(56) References Cited

U.S. PATENT DOCUMENTS

| | | |
|---|---|---|
| 5,871,820 A | 2/1999 | Hasz et al. |
| 5,981,088 A * | 11/1999 | Bruce ............... C23C 14/083 416/241 B |
| 6,117,560 A | 9/2000 | Maloney |
| 6,548,190 B2 | 4/2003 | Spitsberg et al. |
| 7,291,403 B2 | 11/2007 | Nagaraj et al. |
| 7,662,489 B2 | 2/2010 | Litton et al. |
| 7,722,959 B2 | 5/2010 | Schlichting et al. |
| 8,062,759 B2 | 11/2011 | Fu et al. |
| 8,080,283 B2 | 12/2011 | Schlichting et al. |
| 2002/0110698 A1 | 8/2002 | Singh |
| 2007/0116883 A1 | 5/2007 | Gorman et al. |

(Continued)

OTHER PUBLICATIONS

Fan et al., "Interfacial delamination of double-ceramic-layer thermal barrier coating system", Ceramics International, ScienceDirect, vol. 40, Issue 9, Part A, pp. 13793-13802, Nov. 2014.

(Continued)

*Primary Examiner* — Michael M Dollinger

(57) ABSTRACT

An article having a damage-tolerant thermal barrier coating includes a plurality of coating layers disposed over a substrate. The plurality of coatings comprises an inner layer and an outer layer. The outer layer is more resistant to infiltration by nominal CMAS relative to 8 weight percent yttria-stabilized zirconia at a temperature of 1300 degrees Celsius. The inner layer has, in a temperature range from about 1000 degrees Celsius to about 1200 degrees Celsius, a thermal resistance in a range from about $9 \times 10^{-5}$ degree Kelvin per watt to about $23 \times 10^{-5}$ degree Kelvin per watt.

14 Claims, 1 Drawing Sheet

(56) References Cited

U.S. PATENT DOCUMENTS

| | | |
|---|---|---|
| 2007/0160859 A1 | 7/2007 | Darolia et al. |
| 2007/0274837 A1* | 11/2007 | Taylor ........................ C23C 4/02 |
| | | 416/241 R |
| 2008/0026160 A1* | 1/2008 | Taylor ........................ C23C 4/02 |
| | | 427/454 |
| 2008/0160172 A1* | 7/2008 | Taylor ........................ C23C 4/02 |
| | | 427/9 |
| 2012/0276352 A1 | 11/2012 | Liu et al. |
| 2013/0095344 A1* | 4/2013 | Nagaraj ................ C04B 35/486 |
| | | 428/623 |

OTHER PUBLICATIONS

Lee et al., "Design of thermal barrier coatings using gadolinium zirconate ceramics: A study on gadolinium zirconate/YSZ bilayers", Journal of the Ceramic Society of Japan, vol. 117, No. 1365, pp. 550-554, May 1, 2009.

Viswanathan et al., "Multilayer, Multimaterial Thermal Barrier Coating Systems: Design, Synthesis, and Performance Assessment", Journal of the American Ceramic Society, vol. 98, No. 6, pp. 1769-1777, Jun. 2015.

\* cited by examiner

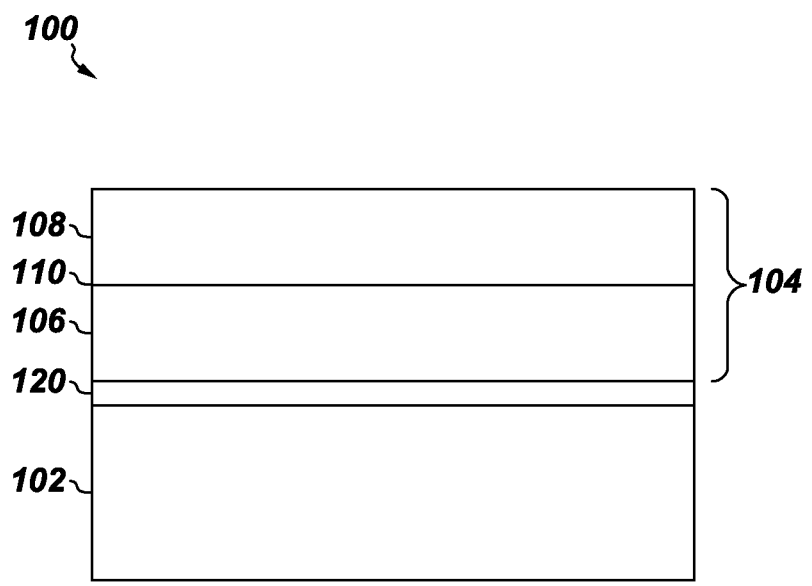

ARTICLES HAVING DAMAGE-TOLERANT THERMAL BARRIER COATING

BACKGROUND

This disclosure generally relates to coatings and components for high temperature applications, such as gas turbine assemblies.

The design of modern gas turbines is driven by the demand for higher turbine efficiency. It is widely recognized that turbine efficiency can be increased by operating the turbine at higher temperatures. In order to assure a satisfactory life span at these higher temperatures, thermal barrier coatings (hereinafter referred to as "TBCs") are applied to airfoils and combustion components of the turbine—such as transition pieces and combustion liners—using various techniques.

A key concern for turbines used in both power generation and propulsion applications is with harmful effects of ingested dust, sand, volcanic ash, and other species entrained in turbine intake air. These species can adhere to TBCs and damage them through the formation of various comparatively low-melting point phases collectively referred to as "CMAS" due to their typical inclusion of such oxide components as calcia, magnesia, alumina, and silica. CMAS material generally melts around 1200° C. (about 2250° F.), which is below the surface temperature expected for TBC's in high-performance turbine components; once molten, the liquid CMAS infiltrates the cracks, pores, columnar grain boundaries, and open defects of TBCs and solidifies to form a glass when the TBCs cool to room temperature. As a result, the TBCs lose compliance and spall prematurely.

The industry standard 8YSZ material (zirconia stabilized with approximately 8 weight percent yttria) used for TBCs is particularly susceptible to degradation via CMAS. One technique to combat spallation resulting from CMAS ingestion involves TBC compositions with higher rare earth contents as compared to conventional TBCs. These high-rare-earth TBCs are designed to react with ingested CMAS and thereby limit its penetration. These high rare earth TBCs, however, have lower fracture toughness than conventional YSZ-based thermal barrier coatings, and thus, while attractive for some turbine applications, simply changing the chemistry of the coating may not be an ideal solution for all turbine designs.

As a result of the above, a need persists in the industry for thermal barrier coatings and related methods for fabricating coated components, where the coatings are resistant to CMAS ingestion (i.e., spallation resistant), include high strain tolerance, are scalable (i.e., compatible with large components), and are relatively inexpensive as compared with conventional thermal barrier coatings.

BRIEF DESCRIPTION

Embodiments of the present invention are provided to meet this and other needs. One embodiment is an article. The article includes a plurality of coating layers disposed over a substrate. The plurality of coatings comprises an inner layer and an outer layer. The outer layer is more resistant to infiltration by nominal CMAS relative to 8 weight percent yttria-stabilized zirconia at a temperature of 1300 degrees Celsius. The inner layer has, in a temperature range from about 1000 degrees Celsius to about 1200 degrees Celsius, a thermal resistance in a range from about 9×10−5 degree Kelvin per watt to about 23×10−5 degree Kelvin per watt.

Another embodiment is an article. The article comprises a plurality of coating layers disposed over a substrate, the plurality comprising an inner layer and an outer layer, wherein the inner layer comprises yttria-stabilized zirconia and has a thickness from about 200 micrometers to about 300 micrometers; and the outer layer comprises a material more resistant to infiltration by nominal CMAS relative to 8 weight percent yttria-stabilized zirconia at a temperature of 1300 degrees Celsius.

DRAWINGS

These and other features, aspects, and advantages of the present invention will become better understood when the following detailed description is read with reference to the accompanying drawing in which like characters represent like parts, wherein:

FIG. 1 illustrates a cross-sectional schematic of an embodiment of the present invention.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Embodiments of the present invention include a coating having a specific architecture that provides desirable resistance to CMAS infiltration while maintaining desirable levels of thermal protection even after a CMAS-driven spallation event. The coating may include a wide range of materials, including stabilized zirconia systems, and may be deposited via scalable processes such as plasma spray techniques.

In one embodiment, as depicted schematically in FIG. 1, an article 100 comprises a substrate 102 and a coating system 104 disposed over the substrate. Substrate 102 may be a high-temperature material, such as a metal or a ceramic. Examples of high-temperature metals include superalloys, such as cobalt-based superalloys and nickel-based superalloys. Article 100 may be a component of a gas turbine assembly; examples include, without limitation, stationary and rotating components exposed to the hot gas path through a gas turbine assembly, such as vanes, blades, shrouds, combustors, or transition pieces.

Coating system 104 comprises an inner layer 106 and an outer layer 108. Outer layer 108 is a CMAS resistant layer, while inner layer 106 provides desirable mechanical properties such as fracture toughness and good adhesion. The coating system 104 provides a measure of thermal resistance during service to reduce heat transfer from the hot gas environment to substrate 102, thereby maintaining the temperature of substrate 102 below a desired limit.

Bi-layer and multi-layer TBCs such as system 104, with CMAS reactive compositions on the top-most layer and more conventional compositions, such as 8YSZ, as the bottom-most layer, are a common approach to increase the life of TBCs that run in dusty conditions. The top-most CMAS reactive layer is expected to react with the CMAS and slow down CMAS infiltration. The bottom-most layer provides resistance to crack propagation and desirable coating system adherence. However, all CMAS reactive top layers eventually spall with increasing dust loading and thermal cycles during service. Once the CMAS reactive layer comes off, the bottom-most layer becomes exposed to CMAS, and because the conventional TBC materials such as 8YSZ found in this layer are highly susceptible to CMAS attack, exposure of this layer to molten CMAS generally results in rapid failure. The resultant region of exposed substrate is prone to rapid environmental attack and dramatically reduced service life.

The present inventors observed, however, that in some circumstances, a CMAS-induced failure of a multilayer TBC spalls to an interface between the outer-most layer and an underlying layer, and then does not spall further. Upon further investigation, it was found that this phenomenon is the result of the heat transfer characteristics of the coating system. In short, as the TBC spalls, reducing the amount of insulating coating disposed between the substrate and the hot gas of the operating environment, the surface temperature of the TBC drops to a point below the melting point of CMAS; at this point the CMAS does not melt and TBC spallation halts.

Conventional coating design practice typically urges a comparatively thin outermost layer to provide CMAS protection, coupled with a comparatively thick layer of, for instance 8YSZ, to provide desirable mechanical properties. The thermal properties of the coating system are usually considered as a whole, that is, to specify an overall coating system thickness. As a result, a conventional bilayer TBC system with a comparatively thick inner layer and a comparatively thin outer layer may be susceptible to rapid failure by the above-described mechanism because the thick inner layer provides sufficient thermal resistance to maintain surface CMAS, accumulating in a damaged area deprived of its outer layer, in a liquid state.

On the other hand, in some applications focused on so-called "low-k" (that is, low thermal conductivity) TBC, a comparatively thin layer of YSZ, such as about 60 micrometers (about 0.002 inches) is often applied for its toughness and chemical compatibility with other layers in the coating system. A thicker layer of YSZ is generally not used in these applications because the bulk of the TBC volume is desired to consist of the low-k material disposed over the thin YSZ. As a result, a bilayer TBC system with this comparatively thin inner layer and comparatively thick outer layer may be susceptible to rapid failure by the above-described mechanism because, upon loss of the upper layer, the thin inner layer would not provide sufficient thermal resistance to maintain substrate temperature below the upper bound of its useful range.

In contrast to conventional multi-layer coatings, coating system 104 is designed to apply the two observations of the inventors' investigations to address the problem of CMAS attack on multilayer systems: 1) that an interface 110 between inner layer 106 and outer layer 108 is a predominant failure site for spallation, and 2) that the surface temperature of the remaining coating after spallation plays a major role in determining the remaining service life of article 100 after spallation of outer layer 108 occurs. If the spallation of the coating system 104 can be arrested before the entire system is removed, the remaining coating thickness can afford some thermal protection to the substrate 102, providing extended life as a result of the lower substrate temperature than would be realized if the entire coating thickness were removed. Article 100 in accordance with the descriptions herein thus is designed to position interface 110 so that, should outer layer 108 spall, the temperature of interface 110, which would then be in contact with the ambient environment, remains below the melting point of CMAS, around 1200° C. Executing this design requires a consideration of various factors related to the heat transfer operable in the service environment of article 100. These factors include the expected temperature and flow characteristics of the hot gas environment during service, the desired upper limit for temperature of substrate 102, and the thermal resistance provided by inner layer 106 and outer layer 108.

Various designs for land-based gas turbines and gas turbine aircraft engines specify gas temperatures and flow conditions at various locations within the turbine assembly. Moreover, materials selection for substrate 102 will generally set a specification for upper allowable substrate temperature.

Given the desired operating conditions for article 100, coating system 104 can be designed to place interface 110 as described above by specifying the thermal resistance of inner layer 106. Thermal resistance of inner layer 106 is a function of the thermal conductivity of the constituent material of the layer 106 and the thickness of the layer 106. Thermal resistance of a given coating, then, is expected to vary with temperature due to its dependence on thermal conductivity, itself a temperature-dependent property. In accordance with embodiments of the present invention, inner layer 106 has, in a temperature range from about 1000 degrees Celsius to about 1200 degrees Celsius, a thermal resistance in a range from about $9 \times 10^{-5}$ degree Kelvin per watt to about $23 \times 10^{-5}$ degree Kelvin per watt, and in particular embodiments this range is from about $15 \times 10^{-5}$ degree Kelvin per watt to about $23 \times 10^{-5}$ degree Kelvin per watt. These values specify a thermal resistance per unit area of coating, and this value is referred to herein as "thermal resistance."

Thermal conductivity of thermal barrier coating materials depends on a number of factors in addition to temperature. Of course, the material selected for the coating plays a major role, as that material will have an inherent conductivity value. Another key factor is the microstructure of the coating. A more dense microstructure, such as is commonly observed for TBC deposited by physical vapor deposition, or even the so-called "dense vertically cracked" TBC deposited by plasma spray methods, will typically have a higher effective thermal conductivity than will a more porous coating of the same material due to the higher density. The effective values for thermal conductivity of various TBC materials deposited by various methods have been catalogued by practitioners in the art and can be readily referenced and/or measured.

As an illustrative example, where inner layer 106 has thermal conductivity properties similar to dense, vertically micro-cracked 8YSZ, an inner layer 106 thickness in a range from about 200 micrometers to about 300 micrometers (about 0.008 inches to about 0.012 inches) corresponds to the specified thermal resistance. Moreover, the thermal resistance provided by about 380 micrometers (about 0.015 inches) of 8YSZ deposited by suspension plasma spray techniques is typically substantially equivalent to that provided by about 250 micrometers (about 0.010 inches) of dense, vertically micro-cracked 8YSZ deposited by air plasma spray techniques. Thus the thickness of inner layer 106 may be designed based on knowledge of the material being used and the technique being applied to fabricate inner layer 106.

Typically, though not necessarily, the inner layer 106 has a higher fracture toughness than the outer layer 108 to provide desirable levels of strain and damage tolerance to coating system 104. The outer layer 108 includes a CMAS-resistant material, meaning that the outer layer 108 is more resistant to infiltration at 1300° C. by molten "nominal CMAS" than is 8YSZ. Some of these materials owe their effective resistance to CMAS infiltration due to their tendency to react very slowly with CMAS, while others react very quickly but rapidly form a reaction product that effectively seals off the material from further exposure to the CMAS. In either case, the material demonstrates overall degradation rates at 1300° C. that are less than what is known in the art to be the case for 8YSZ. For the purposes of this description, the term "nominal CMAS" refers to the following composition, with all percentages in mole percent: 41.7% silica (SiO2), 29.3% calcia (CaO), 12.5% alumina ($AlO_{1.5}$), 9.1% magnesia (MgO), 6.0% iron oxide ($FeO_{1.5}$), and 1.5% nickel oxide (NiO). It will be appreciated that the 1300° C. temperature and the nominal CMAS composition given in this definition represent a reference temperature and a reference composition to define a benchmark for the material's CMAS resistance in a way that can be compared to the CMAS resistance of 8YSZ; use of these reference values does not limit in any way the actual temperature at which article 100 may operate or the actual composition of ingested material that becomes deposited on the coating during operation, both of which, of course, will vary widely in service.

As noted above, the inner material, which is present in inner layer 106, may have higher fracture toughness than the outer material, which is present in outer layer 108. Fracture toughness of the layers may be characterized relative to one another, for example, according to one of several standard techniques, such as indentation techniques, known and widely used in the art. The inner material may be a ceramic material, and in some embodiments is a material used in thermal barrier coatings or other high temperature applications. Yttria-stabilized zirconia, including YSZ having a yttria content in the range from about 6 to about 9 weight percent, is a well-known example of such a material, as are hafnia and titania (including stabilized compositions that include these oxides).

The outer material, used in outer layer 108, is applied for CMAS resistance, as noted above. Many different materials have been described in the art as providing enhanced CMAS protection relative to yttria-stabilized zirconia and other standard TBC materials, and any of these materials may be considered for use in the coating system described herein.

In one embodiment, the outer layer 108 includes an oxide. Oxides that include one or more transition metal elements, alkaline earth elements, rare-earth elements, silicon, aluminum, and/or indium have been described in the art as being resistant to CMAS. In one embodiment, the oxide includes zirconium, hafnium, titanium, or combinations thereof. Zirconia, hafnia, and/or titania materials stabilized with one or more rare-earth elements have been described in the art of CMAS-resistant coatings. Examples of such materials include coatings containing gadolinia and zirconia, such as gadolinia-stabilized zirconia; and coatings containing mixtures of gadolinia and hafnia. Examples of other potentially suitable oxide materials include pyrochlores, such as lanthanum zirconate; garnets, such as those described in U.S. Pat. No. 7,722,959; and oxyapatites, such as those described in U.S. Pat. No. 7,722,959. Sodium-containing oxides, such as sodium oxide, sodium silicate, and sodium titanate, are other examples of CMAS resistant oxide materials. Still other examples include materials having an orthorhombic weberite crystal structure, as described in U.S. patent application Ser. No. 14/525,586. Particular examples of such materials include oxides having a nominal formula $A_3BO_7$, wherein A includes a rare earth element such as gadolinium, and B includes niobium or tantalum.

A further example includes an oxide that includes strontium, gadolinium, and aluminum. For instance, materials having nominal composition $SrGd_2Al_2O_7$ have been shown to have desirable levels of reactivity with CMAS for use as protective material, as described in India Patent Application number 3695/CHE/2015, filed 18 Jul. 2015.

In one particular example, the outer layer includes yttria-stabilized zirconia having higher yttria content (relative to the overall YSZ content) than typical 8YSZ. Generally, the yttria content in this example is greater than 38 weight percent, and in specific embodiments the yttria content is at least about 55 weight percent. Coatings as described herein using YSZ with yttria content greater than 38 weight percent were superior in CMAS resistance to coatings made with lower-yttria YSZ materials.

Other materials besides oxides have been described for use in resisting CMAS, and are also considered as potentially useful in outer layer 108. Examples of such alternative materials include carbides (such as silicon carbide, tantalum carbide, titanium carbide, and others), nitrides (such as silicon nitride, zirconium nitride, tantalum nitride, boron nitride, and others), and silicides (such as chromium silicide, molybdenum silicide, tantalum silicide, titanium silicide, and others).

Also, in some embodiments, the outer layer 108 has a thickness such that the total thermal resistance of the plurality of layers included in coating system 104 is at least about $24 \times 10^{-5}$ degree Kelvin per watt, which value is the nominal thermal resistance provided by about 0.015 inches (about 380 micrometers) of thermally aged, porous 8YSZ.

The materials described herein for both layers 106, 108 of coating system 104 may be applied to substrate 102 with the requisite microstructure using any of various deposition techniques commonly used in industry for the application of ceramic coatings for use in high-temperature components. Plasma spray techniques, including without limitation techniques applying liquid feedstock injection, are particularly attractive due to their scalability and relatively well understood relationships among processing parameters, coating structure, and resultant properties. Vapor deposition techniques, such as electron beam physical vapor deposition (EB-PVD), are also well known for use in deposition of TBC materials and may be suitable for use in some embodiments of the present invention.

A bondcoat 120 is disposed between inner layer 106 and substrate 102 in some embodiments. Bondcoat 120 provides functionality—adhesion promotion and oxidation resistance, for example—in coating system 104 similar to what such coatings generally provide in conventional applications. In some embodiments, bondcoat 120 comprises an aluminide, such as nickel aluminide, or a MCrAlY-type coating well known in the art. These bondcoats may be especially useful when applied to a metallic substrate 102, such as a superalloy, and may be applied using any of various coating techniques known in the art, such as plasma spray, thermal spray, chemical vapor deposition, or physical vapor deposition.

In a particular embodiment, provided to further illustrate the above description, article 100 comprises a plurality 104 of coating layers disposed over a substrate 102, the plurality 104 comprising an inner layer 106 and an outer layer 108. The inner layer 106 comprises yttria-stabilized zirconia and has a thickness from about 200 micrometers to about 300 micrometers. The outer layer 108 comprises a material more resistant to infiltration by nominal CMAS relative to 8 weight percent yttria-stabilized zirconia at a temperature of 1300 degrees Celsius.

EXAMPLES

The following examples are presented to further illustrate non-limiting embodiments of the present invention.

Example 1

15 mils (about 380 micrometers) of conventional porous 8YSZ was deposited by plasma spray on a superalloy test coupon, with a NiCrAlY bondcoat in between to provide adequate adhesion. In a test involving cyclic exposure to CMAS at a temperature of about 2350 degrees Fahrenheit (about 1290 degrees Celsius), the 8YSZ layer was completely spalled in less than 10 cycles.

Example 2

A bilayer TBC was applied to bond-coated metal coupons. The bilayer included an inner layer of 15 mils (about 380 micrometers) of air plasma sprayed dense vertically microcracked 8YSZ and 10 mils (about 250 micrometers) of dense vertically microcracked 55YSZ. In a similar cyclic test as described above, the coating system was completely spalled after about 11 cycles.

Example 3

A bilayer TBC in accordance to embodiments of the present invention was applied to bond-coated metal coupons. The bilayer included an inner layer of 15 mils (about 380 micrometers) of suspension-plasma-sprayed, dense, vertically micro-cracked 8YSZ and 10 mils (about 250 micrometers) of suspension-plasma-sprayed, dense, vertically micro-cracked 55YSZ. In a similar cyclic test as described above, outer layer spalled within a few cycles, but the inner layer remained adhered to the coupons out to 30 cycles, whereupon the test was stopped. The lower thermal resistance of the inner layer compared to the inner layer of Example 2 maintained the TBC surface temperature (after spalling down to the original layer interface) at a temperature below the melting point of CMAS, arresting the spalling mechanism.

Example 4

A first sample having an inner TBC layer of 10 mils (about 250 micrometers) air plasma sprayed dense vertically cracked 8YSZ and an outer layer of 15 mils (about 380 micrometers) of air plasma sprayed dense vertically cracked 55YSZ was fabricated on a bond-coated metal coupon. A second sample having the same inner and outer TBC layer materials was fabricated, but the inner layer thickness was 15 mils (about 380 micrometers) and the outer layer was 10 mils (about 250 micrometers). In the cyclic CMAS exposure test described above, the second sample, with thicker inner layer, completely spalled after reaching 17 cycles, while the first sample, with thinner inner layer, maintained the inner layer thickness out to 20 cycles, whereupon the test was stopped.

These examples serve to demonstrate the criticality of thermal resistance of the inner layer in promoting extended service life for articles protected by multi-layer TBC's.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An article comprising:
a plurality of coating layers disposed over a substrate, the plurality comprising an inner layer and an outer layer, wherein
a) the outer layer comprises yttria-stabilized zirconia with an yttria content greater than 38 weight percent and is more resistant to infiltration by nominal CMAS relative to 8weight percent yttria-stabilized zirconia at a temperature of 1300 degrees Celsius; and
b) the inner layer has, in a temperature range from about 1000 degrees Celsius to about 1200 degrees Celsius, a thermal resistance in a range from about 9 $\times 10^{-5}$ degree Kelvin per watt to about 23 $\times 10^{-5}$ degree Kelvin per watt, and a thickness of from about 200 to about 300 μm,
wherein a thickness of the outer layer is greater than the thickness of the inner layer.

2. The article of claim 1, wherein the outer layer has a thickness such that the total thermal resistance of the plurality of coating layers is at least about 24 degree Kelvin per watt.

3. The article of claim 1, wherein the inner layer comprises yttria-stabilized zirconia.

4. The article of claim 3, wherein the yttria-stabilized zirconia has a yttria content in a range from about 6 weight percent to about 9 weight percent.

5. The article of claim 1, wherein the inner layer comprises stabilized hafnia, stabilized titania, or combinations thereof.

6. The article of claim 1, wherein the yttria content is at least about 55 weight percent.

7. The article of claim 1, wherein the article comprises a turbine airfoil component or a turbine combustion component.

8. The article of claim 1, wherein the substrate comprises a superalloy.

9. An article comprising:
a plurality of coating layers disposed over a substrate, the plurality comprising an inner layer and an outer layer, wherein
the inner layer comprises yttria-stabilized zirconia and has a thickness from about 200 micrometers to about 300 micrometers; and
the outer layer comprises yttria-stabilized zirconia with an yttria content greater than 38 weight percent and is more resistant to infiltration by nominal CMAS relative to 8 weight percent yttria-stabilized zirconia at a temperature of 1300 degrees Celsius,
wherein a thickness of the outer layer is greater than the thickness of the inner layer.

10. An article, comprising:
a substrate; and
a plurality of coating layers disposed on the substrate, the plurality of coating layers comprising an inner coating layer and an outer coating layer, wherein the inner coating layer comprises a first YSZ material having an yttria content between 6 and 9 weight percent, a thermal resistance in a range from $9 \times 10^{-5}$ to $23 \times 10^{-5}$ degree Kelvin per watt, and a thickness of from 200 to 300 μm, and the outer coating comprises a second YSZ material having an yttria content greater than 38 weight percent and a thickness such that a total thermal resistance of the plurality of coating layers is at least $24 \times 10^{-5}$ degree Kelvin per watt and wherein the thickness of the outer coating layer is greater than the thickness of the inner coating layer.

11. The article of claim 10, wherein the inner layer has a thickness of about 250 μm and the outer layer is 55YSZ having a thickness of about 380 μm.

12. The article of claim 11, wherein the inner layer and the outer layer are air plasma sprayed dense vertically cracked layers.

13. The article of claim 1, wherein wherein the inner layer has a thickness of about 250 μm and the outer layer is 55YSZ having a thickness of about 380 μm.

14. The article of claim 9, wherein wherein the inner layer has a thickness of about 250 μm and the outer layer is 55YSZ having a thickness of about 380 μm.

* * * * *